(12) United States Patent
Cavender-Bares

(10) Patent No.: US 10,070,577 B2
(45) Date of Patent: Sep. 11, 2018

(54) REAL-TIME FIELD MAPPING FOR AUTONOMOUS AGRICULTURAL PLATFORM

(71) Applicant: RowBot Systems LLC, Minneapolis, MN (US)

(72) Inventor: Kent Cavender-Bares, St. Paul, MN (US)

(73) Assignee: RowBot Systems LLC, Minneapolis, MN (US)

(*) Notice: Subject to any disclaimer, the term of this patent is extended or adjusted under 35 U.S.C. 154(b) by 32 days.

(21) Appl. No.: 15/427,265

(22) Filed: Feb. 8, 2017

(65) Prior Publication Data

US 2017/0223889 A1 Aug. 10, 2017

Related U.S. Application Data

(60) Provisional application No. 62/293,070, filed on Feb. 9, 2016.

(51) Int. Cl.
*A01C 21/00* (2006.01)
*G05D 1/00* (2006.01)
*G05D 1/02* (2006.01)

(52) U.S. Cl.
CPC .......... *A01C 21/005* (2013.01); *A01C 21/007* (2013.01); *G05D 1/0088* (2013.01); *G05D 1/021* (2013.01); *G05D 2201/0201* (2013.01)

(58) Field of Classification Search
CPC .. A01C 21/005; A01C 21/007; G05D 1/0088; G05D 1/021
See application file for complete search history.

(56) References Cited

U.S. PATENT DOCUMENTS

| | | | |
|---|---|---|---|
| 4,628,633 | A | 12/1986 | Nilsson |
| 5,884,224 | A | 3/1999 | McNabb et al. |
| 6,199,000 | B1 | 3/2001 | Russell et al. |
| 6,516,271 | B2 | 2/2003 | Upadhyaya et al. |
| 6,553,299 | B1 | 4/2003 | Keller et al. |
| 6,553,312 | B2 | 4/2003 | Upadhyaya et al. |
| 8,683,742 | B1 | 4/2014 | Cox |
| 8,744,626 | B2 | 6/2014 | Johnson et al. |
| 8,849,523 | B1 | 9/2014 | Chan et al. |
| 9,265,187 | B2 | 2/2016 | Cavender-Bares et al. |
| 9,288,938 | B2 | 3/2016 | Cavender-Bares et al. |
| 9,389,298 | B2 | 7/2016 | Smithennan |
| 9,392,743 | B2 | 7/2016 | Camacho-Cook et al. |

(Continued)

*Primary Examiner* — Basil T Jos
(74) *Attorney, Agent, or Firm* — Patterson Thuente Pedersen, P.A.

(57) ABSTRACT

A method of using an unmanned agricultural robot to generate an anticipatory geospatial data map of the positions of annual crop rows planted within a perimeter of an agricultural field, the method including the step of creating a geospatial data map of an agricultural field by plotting actual annual crop row positions in a portion of the geospatial data map that corresponds to a starting point observation window, and filling in a remainder of the geospatial data map with anticipated annual crop row positions corresponding to the annual crop rows outside of the starting point observation window, and refining the geospatial data map by replacing the anticipated annual crop row positions with measured actual annual crop row positions when an unexpected obstacle is encountered.

1 Claim, 18 Drawing Sheets

(56) References Cited

U.S. PATENT DOCUMENTS

2004/0264763 A1* 12/2004 Mas .................. G01C 23/00
  382/154
2014/0379228 A1  12/2014  Batcheller et al.
2016/0124433 A1   5/2016  Cavender-Bares et al.
2016/0157415 A1   6/2016  Cavender-Bares et al.
2016/0361949 A1  12/2016  Cavender-Bares et al.

* cited by examiner

REAL-TIME FIELD MAPPING FOR AUTONOMOUS AGRICULTURAL PLATFORM

RELATED APPLICATION INFORMATION

This application claims the benefit of U.S. Provisional Application 62/293,070, filed Feb. 9, 2016, which is hereby incorporated by reference.

TECHNICAL FIELD

The present disclosure relates generally to unmanned agricultural robots. More particularly, the present disclosure relates to the generation of a geospatial data map through the use of a combination of measured, actual crop row positions and anticipated crop row positions.

BACKGROUND

Specific robotic solutions are currently being developed to aid farmers in the growth of annual row crops, such as corn. Specific solutions include improvements in tailoring the amount of fertilizer added to a particular area of an agricultural field to fit the needs of the crops within that area, fertilizing crops that have grown to a height where use of conventional fertilization equipment would be impractical, seeding a second cover crop while a first crop is still growing or mature and still on the field and/or the collection of various data to maximize the output of an agricultural field. Several examples of unmanned agricultural robots are disclosed in U.S. Pat. Nos. 9,288,938; 9,392,743; and 9,265,187, the contents of which are incorporated by reference herein.

Unmanned agricultural robots that operate autonomously in agricultural settings require geospatial data as a basis for their operation. In a typical application, a field perimeter defines an absolute boundary across which an unmanned agricultural robot is restricted from crossing for safety reasons. Within the perimeter, various more refined data may be required to facilitate operation. For example, high-resolution data on the actual crop row positions, either previously collected or generated on-the-fly, may be necessary to prevent crop damage by the unmanned agricultural robot.

In cases where the unmanned agricultural robot is expected to navigate between two adjacent crop rows, the geospatial data is often referred to as an "as-planted map," which is typically created using the GPS-based "precision planting" system on the tractor used for planting operations. However, not all fields are planted with GPS-based systems, and the geospatial data for those fields that are planted with GPS-based systems can be of variable accuracy.

In a typical operation of an unmanned agricultural robot, the geospatial data of the crop location is combined with sensors onboard the unmanned robotic platform for fine-scale navigation. That is, one or more sensors determine the proximity of the unmanned agricultural robot side-to-side between the crop rows, thereby providing feedback to the unmanned agricultural robot's control system, which in turn continually adjusts the orientation of the unmanned agricultural robot relative to the crop rows.

Assuming that there is a high-quality as-planted map for a field, as well as onboard sensors for understanding the precise location of crop rows, there can still be unexpected situations that would impact the navigation of an unmanned agricultural robot, such as mis-planted rows or weeds. Thus, even the best current precision planting technology may not be sufficient for fully enabling operation of the unmanned agricultural robot on agricultural fields.

What is needed for robust navigation of unmanned agricultural robots on agricultural fields is an on-board system that can learn essential details of the field in real time. Such a system would be flexible in the sense that it could map the entire field with minimal pre-existing information, taking into account challenges such as mis-planted rows and patches of weeds.

SUMMARY OF THE DISCLOSURE

Embodiments of the present disclosure meet the need for a robust real-time mapping solution to support navigation of unmanned agricultural robots that carry out various in-season management tasks on agricultural fields. Examples of such management tasks include collecting plant and soil data, weed removal, fertilizer application, and seeding of cover crops between rows of a mature crop plants, like corn.

One embodiment of the present disclosure provides a method of using an unmanned agricultural robot to generate an anticipatory geospatial data map of the positions of annual crop rows planted within a perimeter of an agricultural field. The method includes delivering an unmanned agricultural robot, programmed with a self-direction program, to the agricultural field. The unmanned agricultural robot can be positioned at a starting point on the agricultural field. One or more aerial mapping sensors can be deployed at a height above the annual crop rows, so as to enable the one or more aerial mapping sensors to capture geospatial data within an observation window of the agricultural field. In one embodiment, the observation window can be dimensioned such that a width and length of the observation window are at least three times a nominal width of the annual crop rows. The deployed one or more aerial mapping sensors can be used to measure the actual annual crop row positions within the starting point observation window. The actual annual crop row positions can be used to create a geospatial data map of the entire agricultural field by plotting the actual annual crop row positions in a portion of the geospatial data map that corresponds to the starting point observation window, and filling in a remainder of the geospatial data map with anticipated annual crop row positions corresponding to the annual crop rows outside of the starting point observation window. In one embodiment, the measured actual annual crop row positions can be used to predict the anticipated annual crop row positions within the perimeter of the agricultural field. The self-direction program can be activated to autonomously navigate the unmanned agricultural robot within the perimeter of the agricultural field.

In one embodiment, as the observation window moves along with the unmanned agricultural robot through the agricultural field, the geospatial data map can be refined by replacing the anticipated annual crop row positions with measured actual annual crop row positions. In another embodiment, the one or more aerial mapping sensors can periodically refine the geospatial data map by replacing the anticipated annual crop row positions with measured actual annual crop row positions within the observation window when an unexpected obstacle is encountered during autonomous navigation.

One embodiment of the present disclosure provides for an unmanned agricultural robot mapping system that can generate detailed maps of the geospatial location of crop rows as the unmanned agricultural robot moves through the agricultural field. The unmanned agricultural robot mapping system can include one or more unmanned agricultural robots, each having a power source and wheels or tracks or a combination thereof for mobility. Each unmanned agricultural robot can include a mast that extends vertically and can optionally be retracted when not in use. The mast can be used to elevate an aerial mapping sensor module, which can include one or more aerial mapping sensors used to determine the location of an unmanned agricultural robot relative to those crop rows in its surroundings. In one embodiment, the aerial mapping sensor is a digital camera. In one embodiment, the aerial mapping sensor can be configured to determine distances to objects, at can comprise a stereo camera and/or light detection and ranging (LIDAR) sensor.

One embodiment of the present disclosure provides for an unmanned agricultural robot mapping system that includes an aerial mapping sensor on an extendable mast combined with one or more computer algorithms that process the sensor data in order to resolve the geospatial location of crop rows in the local surroundings of the autonomous ground robot.

One embodiment of the present disclosure provides for the unmanned agricultural robot mapping system to be used for periodically resolving the location of crop rows in the unmanned agricultural robot's local surroundings (local field map or L-FMAP) for the purpose of building a field map (FMAP) in real time. When a new L-FMAP is created, some fraction of the overall FMAP is known; the location of some rows may be regarded as anticipatory or tentative. Each new L-FMAP would extend the proportion of area, or row segments, with known locations.

In typical operation, the unmanned agricultural robot could begin at a known location on the FMAP and use on-board navigational sensors, such as LIDAR or stereocamera, to navigate between rows until a non-standard vegetation state is detected ahead, such as a patch of heavy weed growth or crop rows planted substantially perpendicular to the rows in which the unmanned agricultural robot is operating. In these cases, a new L-FMAP could be created thereby improving and updating the row layout on the overall FMAP. In one embodiment of the present disclosure the unmanned agricultural robot could use onboard algorithms to determine the best route to be taken given the now-improved FMAP. In another embodiment, the unmanned agricultural robot can send data including the FMAP and the robot's position and heading relative to the FMAP to a remotely-located human operator, who can make a determination of the best path for the unmanned agricultural robot to take next. In such a case, the onboard systems of the unmanned agricultural robot can create several alternative paths to resolve the navigational impediment, and the remotely-located operator may then select one path from the several alternatives.

One embodiment of the present disclosure provides for the use of L-FMAPs in cases where an unexpected obstacle is encountered and inhibits the planned motion of the unmanned agricultural robot. In such a case, the L-FMAP combined with the FMAP can provide one or more alternative courses for the unmanned agricultural robot in order to avoid a collision with the obstacle. The unmanned agricultural robot can then select the appropriate course, or a remotely-located operator could be involved in selecting the course for the unmanned agricultural robot to take to avoid the obstacle. In a situation where the unmanned agricultural robot is operating with many rows of crop on either side of it, a typical resolution involving an obstacle is to alter course to the right (or the left) and then continue parallel to the original direction until clear of the obstacle at which point returning to the left (or the right) until meeting and rejoining the original course. During the course of such a maneuver, the unmanned agricultural robot would necessarily drive over some of the crop in order to avoid the obstacle, and the L-FMAP would be useful in limiting crop damage during the obstacle avoidance maneuver.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1:
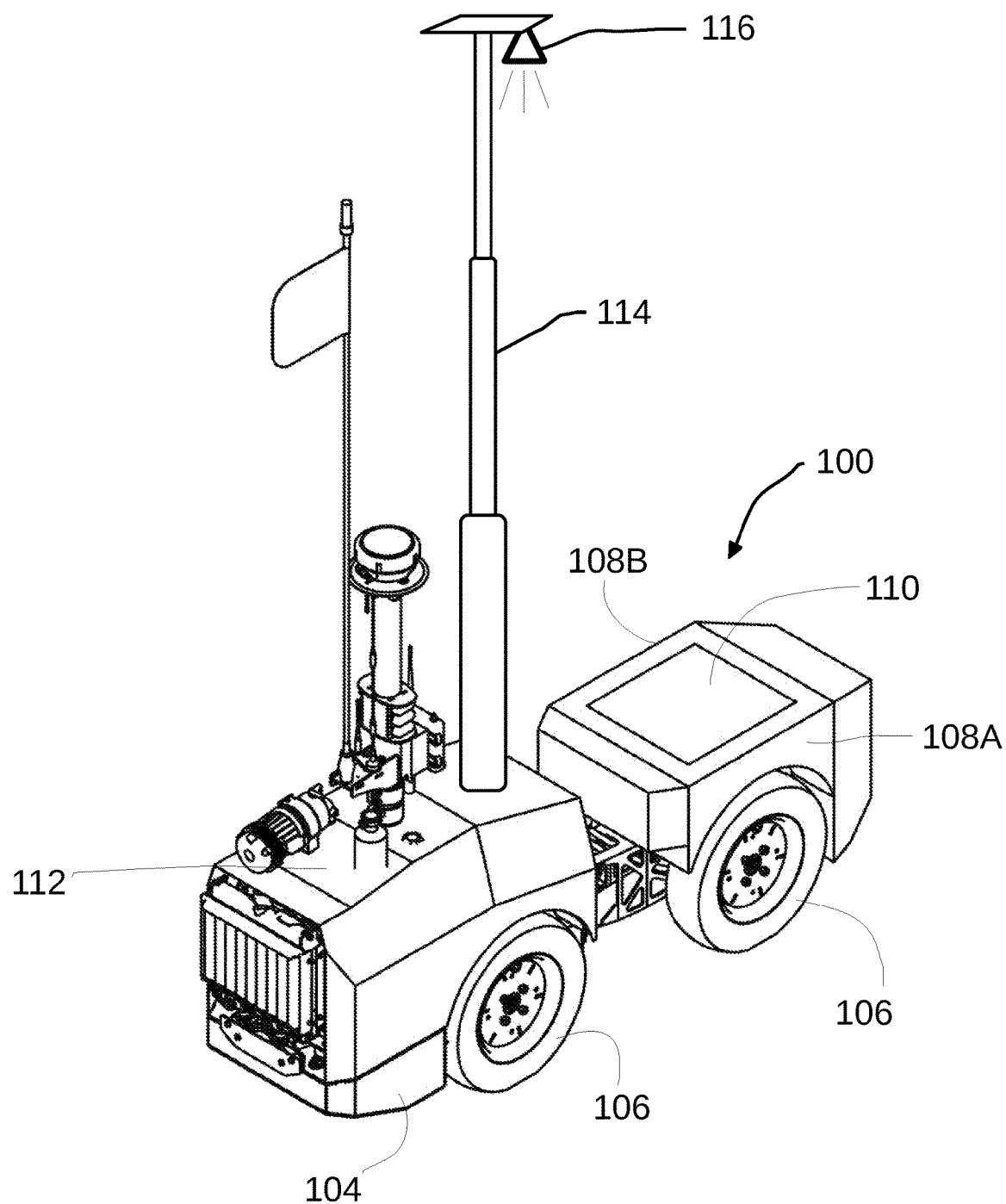
FIG. 1 is a perspective view depicting an unmanned agricultural robot with extendable mast configured with an aerial mapping sensor, in accordance with an embodiment of the disclosure.

While embodiments of the disclosure are amenable to various modifications and alternative forms, specifics thereof are shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

Referring to FIG. 1, an unmanned agricultural robot 100 is depicted according to an embodiment of the disclosure. Unmanned agricultural robot 100 can be configured to selectively perform one or more in season management tasks on an agricultural field 101 having adjacent rows of annual crop rows 102 planted so as to provide a conventional annual crop row spacing between two adjacent annual crop rows 102 of not more than thirty-six inches. Unmanned agricultural robot 100 can include a base 104 operably coupled to a plurality of ground engaging wheels 106. Unmanned agricultural robot 100 can have a first lateral side 108A and a second lateral side 108B, wherein the first and second lateral sides 108A/B oppose one another and are separated by a distance defining the width of the unmanned agricultural robot 100, the width so dimensioned as to be receivable within the space between two adjacent annual crop rows 102. Unmanned agricultural robot 100 can be programmed with a self-direction program to autonomously navigate the unmanned agricultural robot 100 between the two adjacent annual crop rows 102, and to avoid other unmanned agricultural robots, while selectively performing the one or more in season management tasks on the agricultural field 101. In some embodiments, unmanned agricultural robot 100 can include a first portion 110, and a second portion 112, wherein the first portion 110 is pivotably coupled to the second portion 112, and wherein each portion includes at least one ground engaging wheel 106.

In one embodiment, unmanned agricultural robot 100 includes a mast 114. Mast 114 can be extendable and telescoping, so as to be selectively raised and lowered from the base 104 of unmanned agricultural robot 100. One or more aerial mapping sensors 116 can be operably coupled to a top portion of the mast 114. In one embodiment, mast 114 can extend vertically above the unmanned agricultural robot 100, thereby deploying the one or more aerial mapping sensors 116 at a height above the annual crop rows 102, so as to enable the one or more aerial mapping sensors 116 to capture geospatial data within an observation window of the agricultural field 101.

Aerial mapping sensors 116 can be capable of providing data that can be used to localize the position of the unmanned agricultural robot 100 in relation to the annual crop rows 102 within a given observation window. Aerial mapping sensors 116 can include a standard imaging camera, a stereo camera or a laser rangefinder (LIDAR), or a combination thereof which can provide data useful for determining distances to objects.

Figure 2:
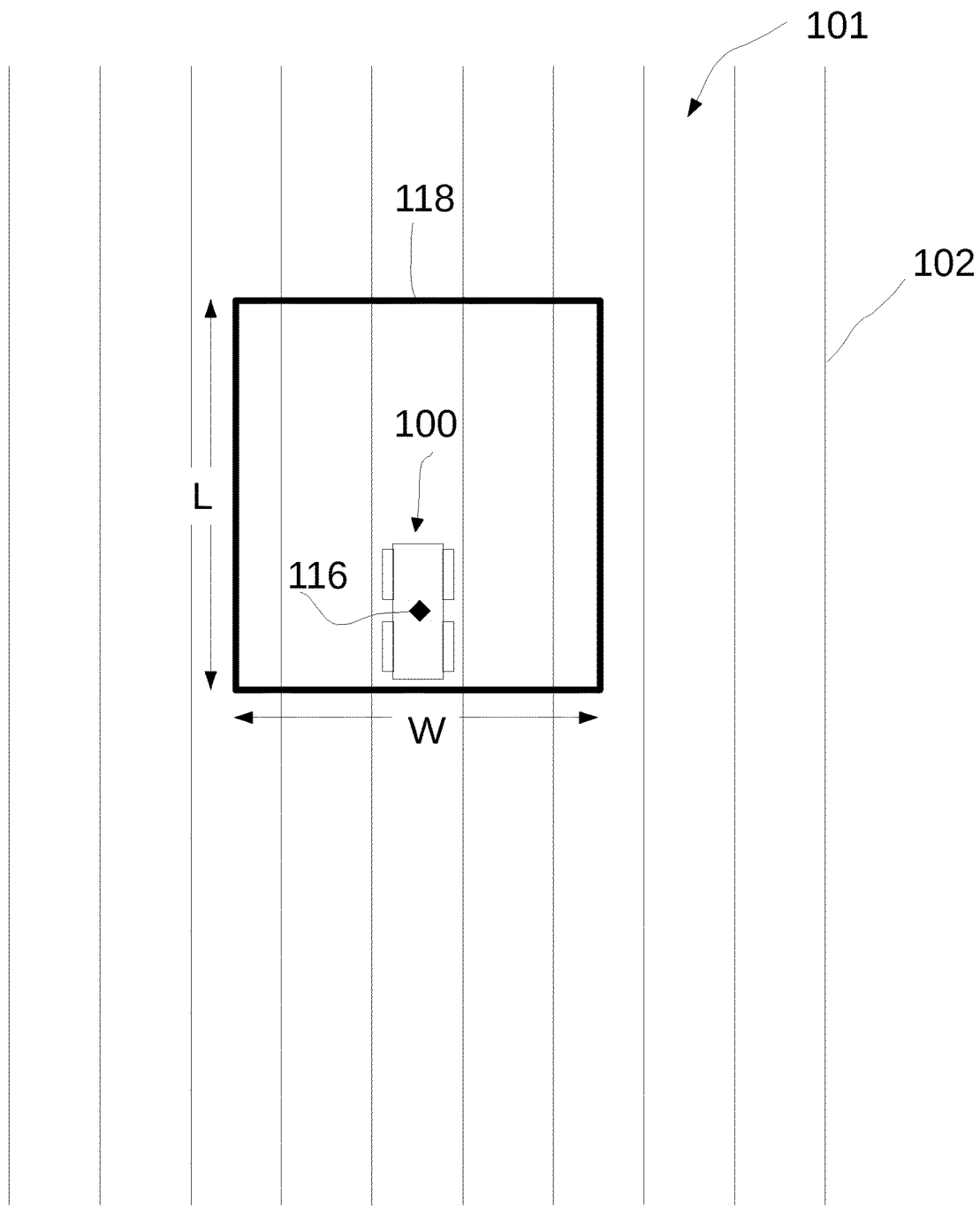
FIG. 2 is a top view depicting an observation window surrounding an autonomous agricultural robot operating between annual crop rows, in accordance with an embodiment of the disclosure.
Figure 3:
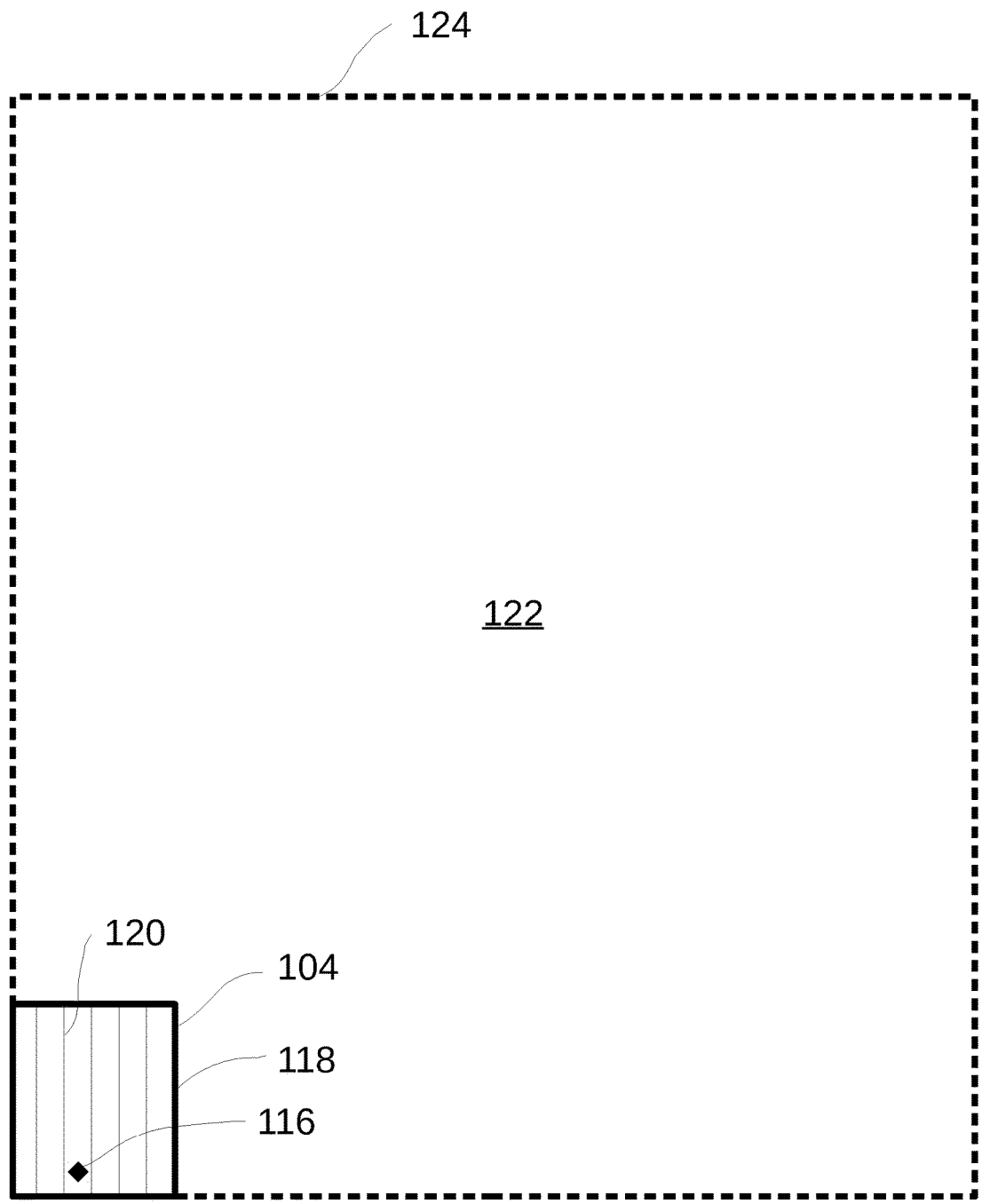
FIG. 3 depicts a geospatial data map depicting a perimeter of an agricultural field and an observation window at a starting point within an agricultural field, in accordance with an embodiment of the disclosure.

Referring to FIG. 2, an agricultural field 101 having annual crop rows 102 is depicted. Unmanned agricultural robot 100 is positioned within agricultural field 101 with one or more aerial sensors 116 deployed at a height above the annual crop rows 102 so as to enable the one or more aerial mapping sensors 116 to capture geospatial data within an observation window 118. In one embodiment, observation window 118 has a length of at least fifty feet and a width of at least fifty feet. In other embodiments, the size of the observation window 118 depends upon the height of the one or more aerial mapping sensors 116 above the agricultural field 101. In one embodiment, the observation window 118 can be dimensioned such that width and length are at least equivalent to several times the nominal annual crop row 102 spacing. For example, in one embodiment, the observation window 118 has a width and length that is at least three times the nominal width of the annual crop rows 102. In another embodiment, the observation window 118 has a width so as to permit the one or more aerial mapping sensors 116 to view between four and ten adjacent crop rows, and a length of a substantially similar dimension. Unmanned agricultural robot 100 can use the one or more aerial mapping sensors 116 to measure the actual annual crop row positions 120 within the observation window 118 for the generation of a geospatial data map 122. Referring to FIG. 3, a geospatial data map 122 is depicted in accordance with an embodiment of the disclosure. The geospatial data map 122 of the entire agricultural field 101 is generated by plotting the actual and anticipated annual crop row positions within a perimeter 124 of the agricultural field 101. The perimeter 124 of an agricultural field 101 is generally known and can be pre-defined, but the precise layout of the annual crop rows 102 is often not known with a high degree of precision.

FIG. 3 depicts the unmanned agricultural robot 100 at a starting point. The one or more aerial mapping sensors 116 can be used to measure the actual annual crop row positions 120 within the starting point observation window 118. One or more computer algorithms in combination with the one or more aerial mapping sensors 116 can be used to determine the exact geospatial location of the annual crop rows 102 relative to the unmanned agricultural robot 100. The actual crop row positions 120 can then be plotted on the geospatial data map 122, which as depicted in FIG. 3, can be plotted as one or more solid lines.

Figure 4:
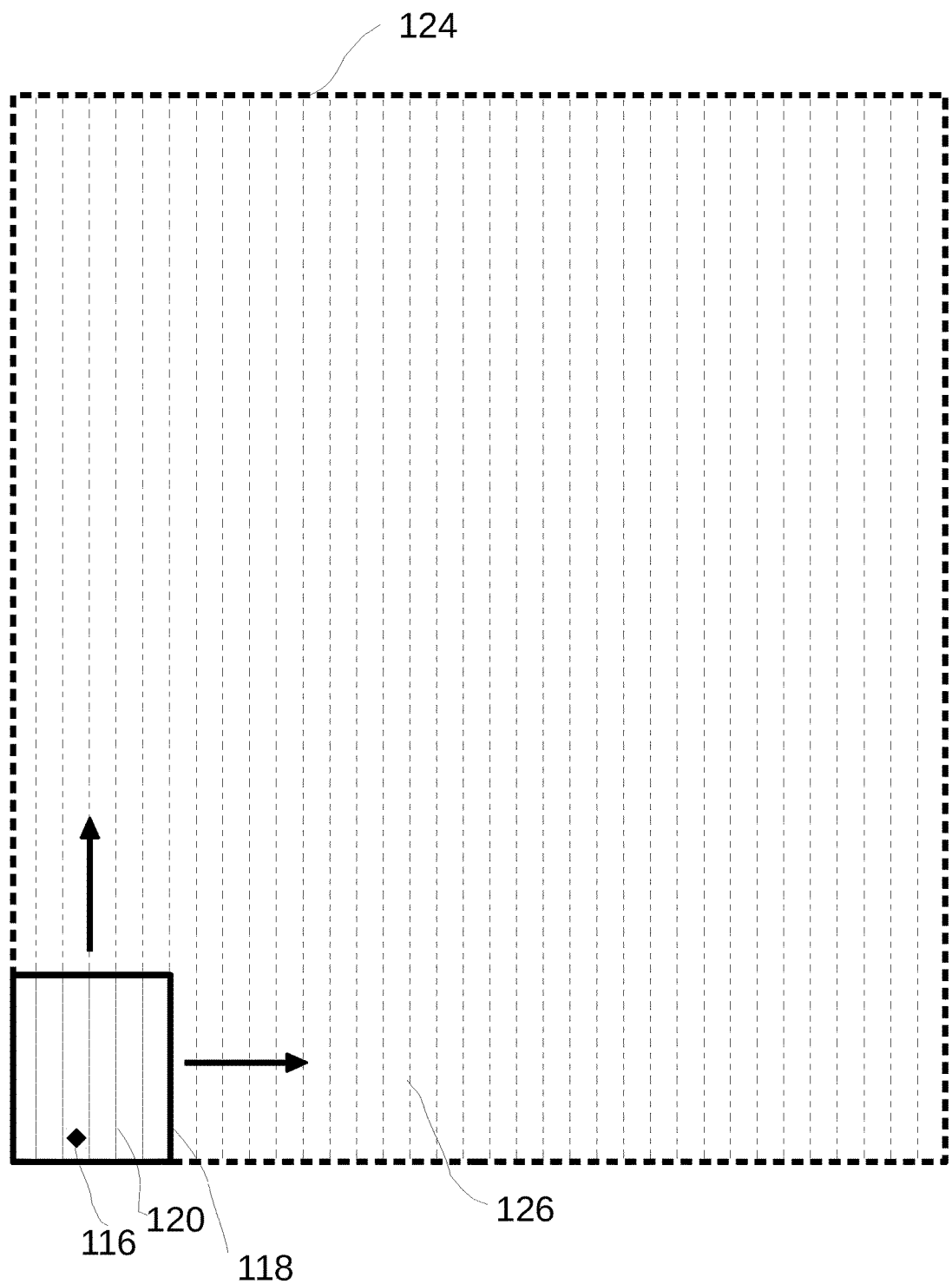
FIG. 4 depicts the geospatial data map of FIG. 3 with crop row positions plotted on the geospatial data map, wherein actual crop row positions are indicated by solid lines and anticipated crop row positions are indicated by dashed lines.

Referring to FIG. 4, plotting of the annual crop row positions can be extended on geospatial data map 122 by continuing to plot the anticipated annual crop row positions 126, corresponding to the annual crop rows 102 outside of the starting point of the observation window 118. The anticipated annual crop row positions 126 can be plotted on geospatial data map 122 as one or more dashed or dotted lines. In other embodiments, the various annual crop row positions 120 and anticipated annual crop row positions 126 are represented by other figures, including one or more continuous and/or noncontiguous symbols or representations. In embodiments where the geospatial data map 122 is stored electronically without visual display on a user interface, the anticipated annual crop row positions 126 and the actual crop row positions 120 can be represented by mathematical or other data representations.

In one embodiment, actual crop row positions 120 can be extended longitudinally as anticipated annual crop row positions 126. Additional anticipated crop row positions 126 can be added laterally to either side of the actual crop row positions 120 within the perimeter 124. Accordingly, in one embodiment, the actual annual crop row positions 120 are used to predict the anticipated annual crop row positions 126 within the perimeter 124 of agricultural field 101.

Figure 5:
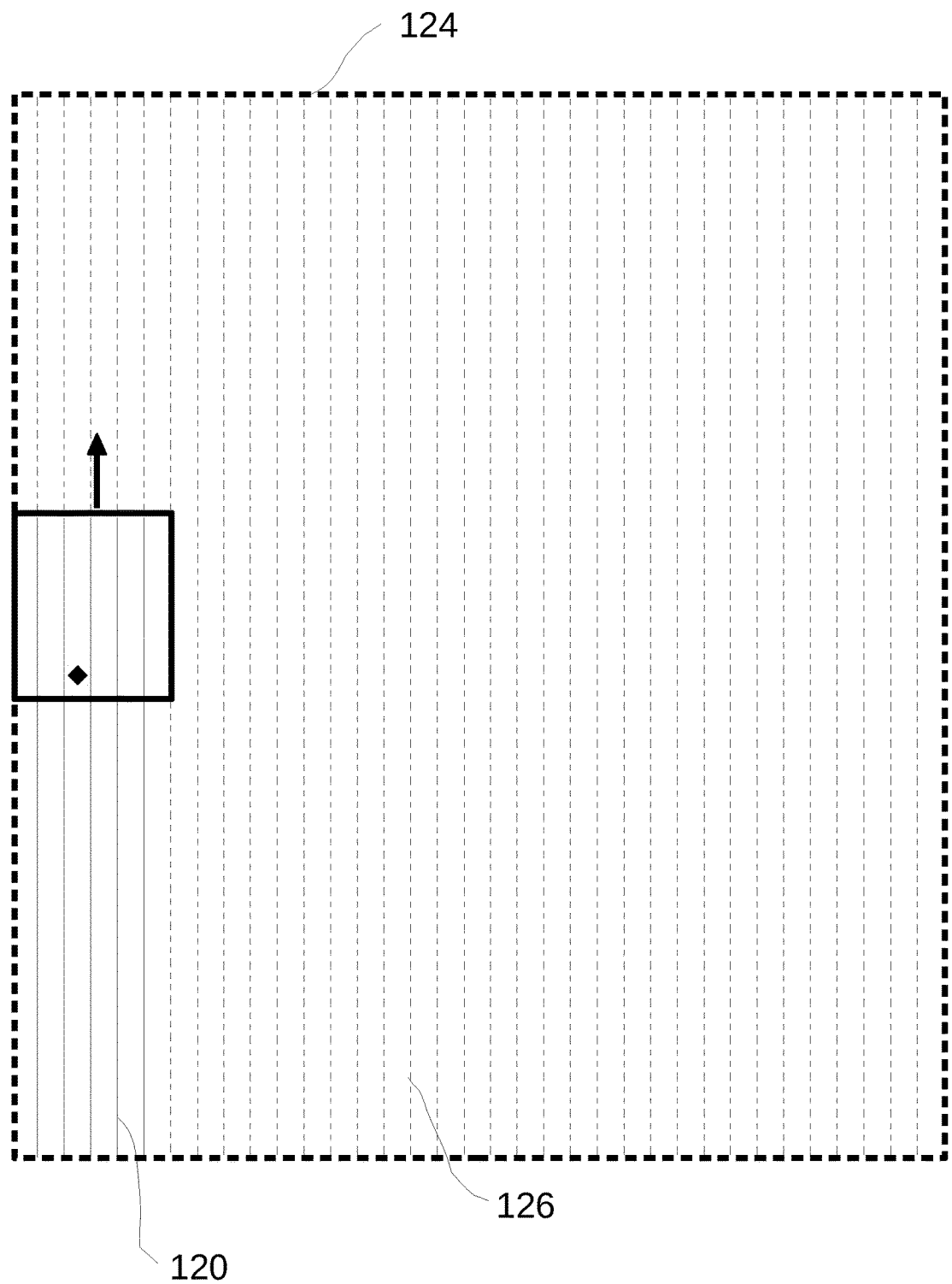
FIG. 5 depicts the geospatial data map of FIG. 4, wherein the observation window has moved, and some of the previously plotted anticipated crop row positions have been replaced by newly verified actual crop row positions.
Figure 6:
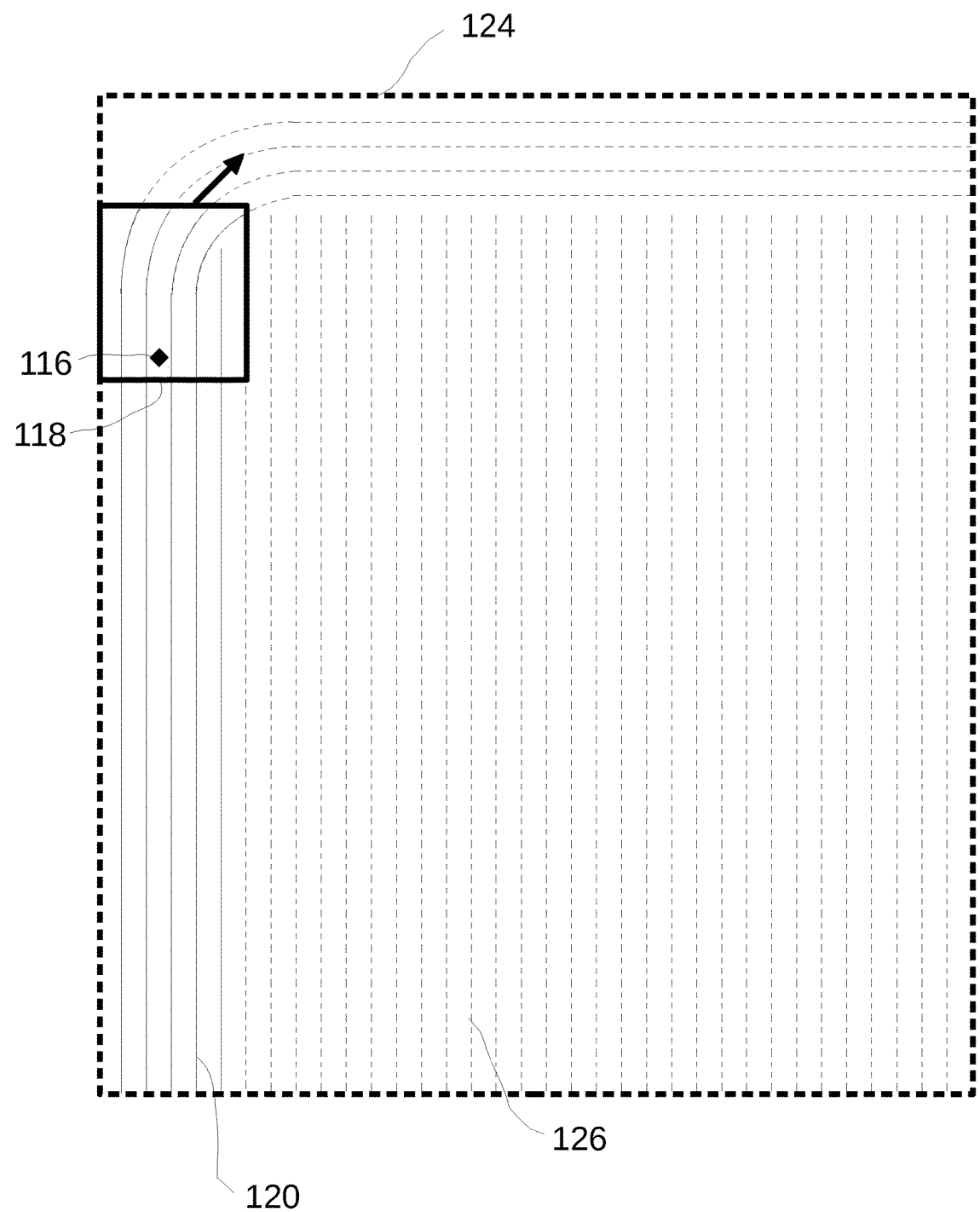
FIG. 6 depicts the geospatial data map of FIG. 5, wherein the observation window has moved to a curve at the corner of the agricultural field.
Figure 7:
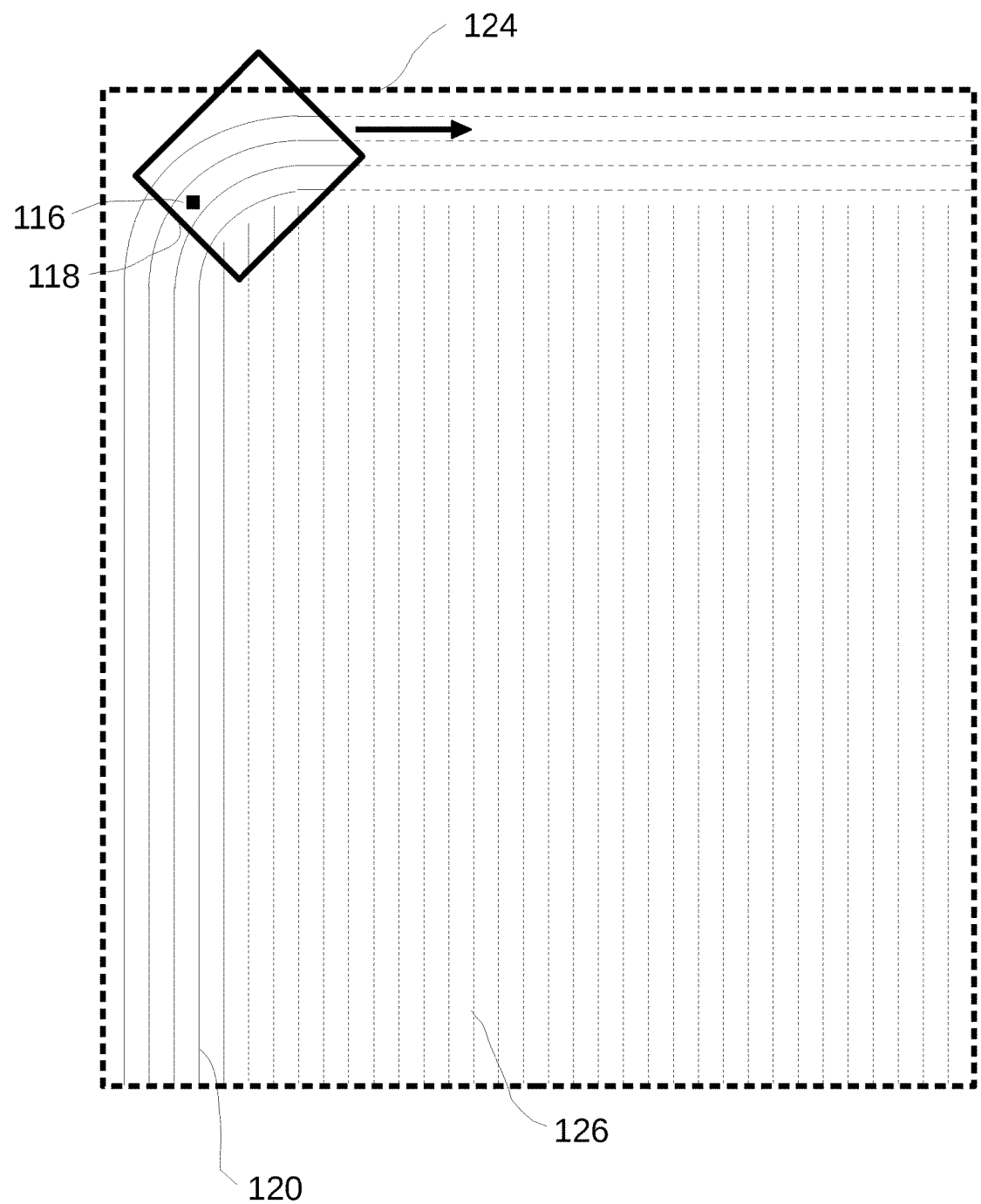
FIG. 7 depicts the geospatial data map of FIG. 6, wherein the observation window has moved further through the curve at the corner of the agricultural field.
Figure 8:
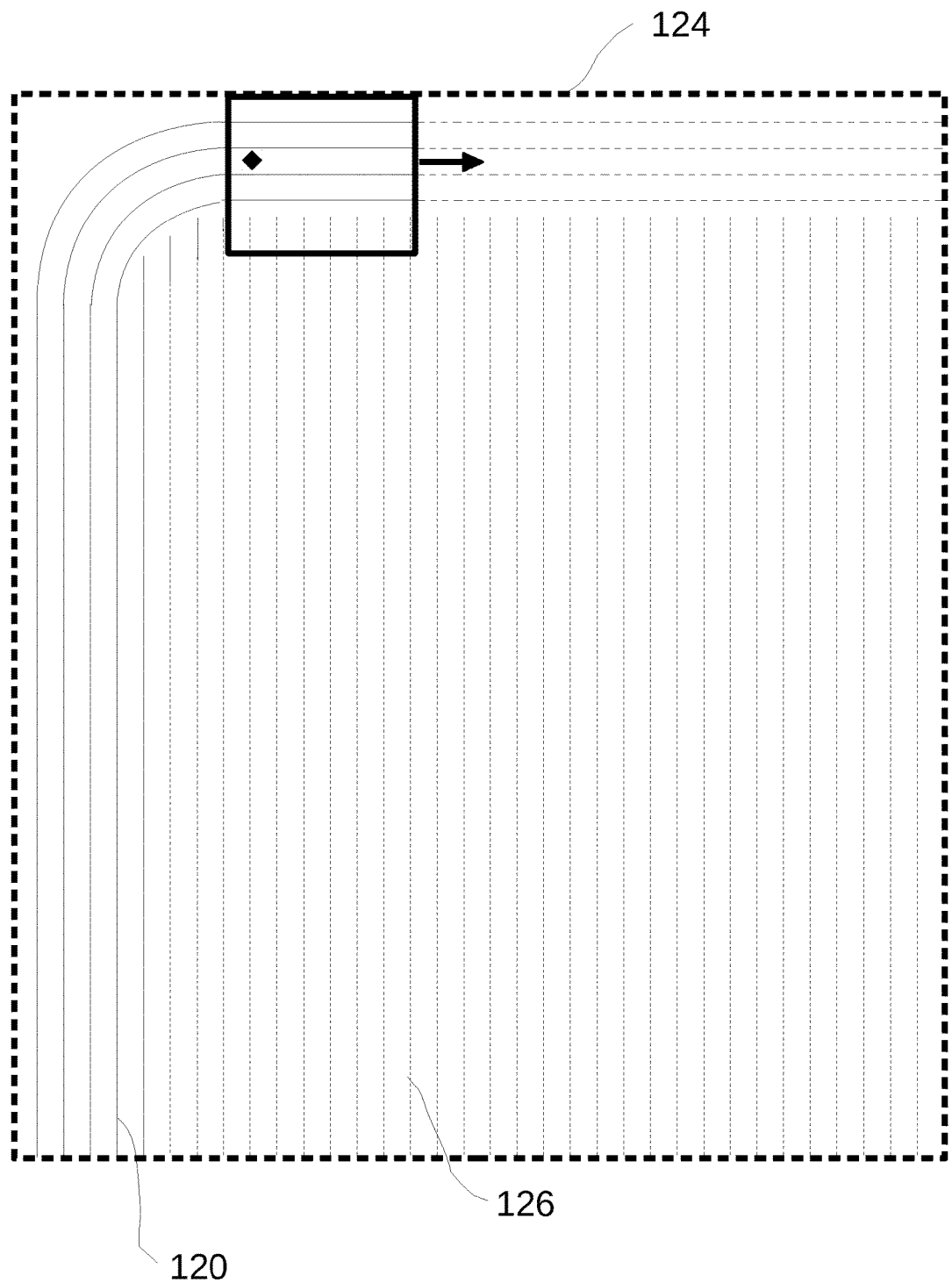
FIG. 8 depicts the geospatial data map of FIG. 7, wherein newly measured crop row positions have been plotted as actual crop row positions.
Figure 9:
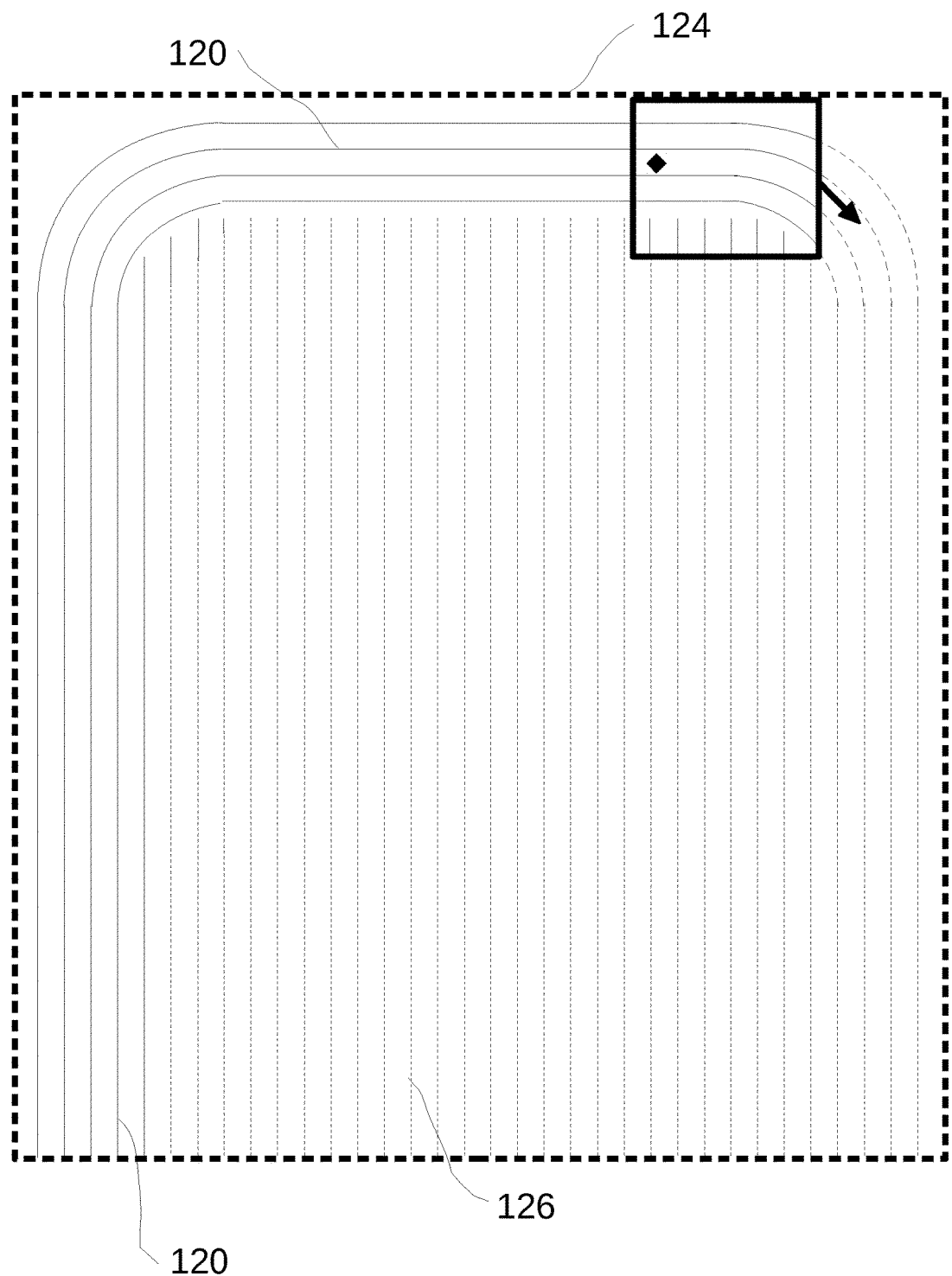
FIG. 9 depicts the geospatial data map of FIG. 8, wherein the observation window has moved to another curve at a corner of the agricultural field.
Figure 10:
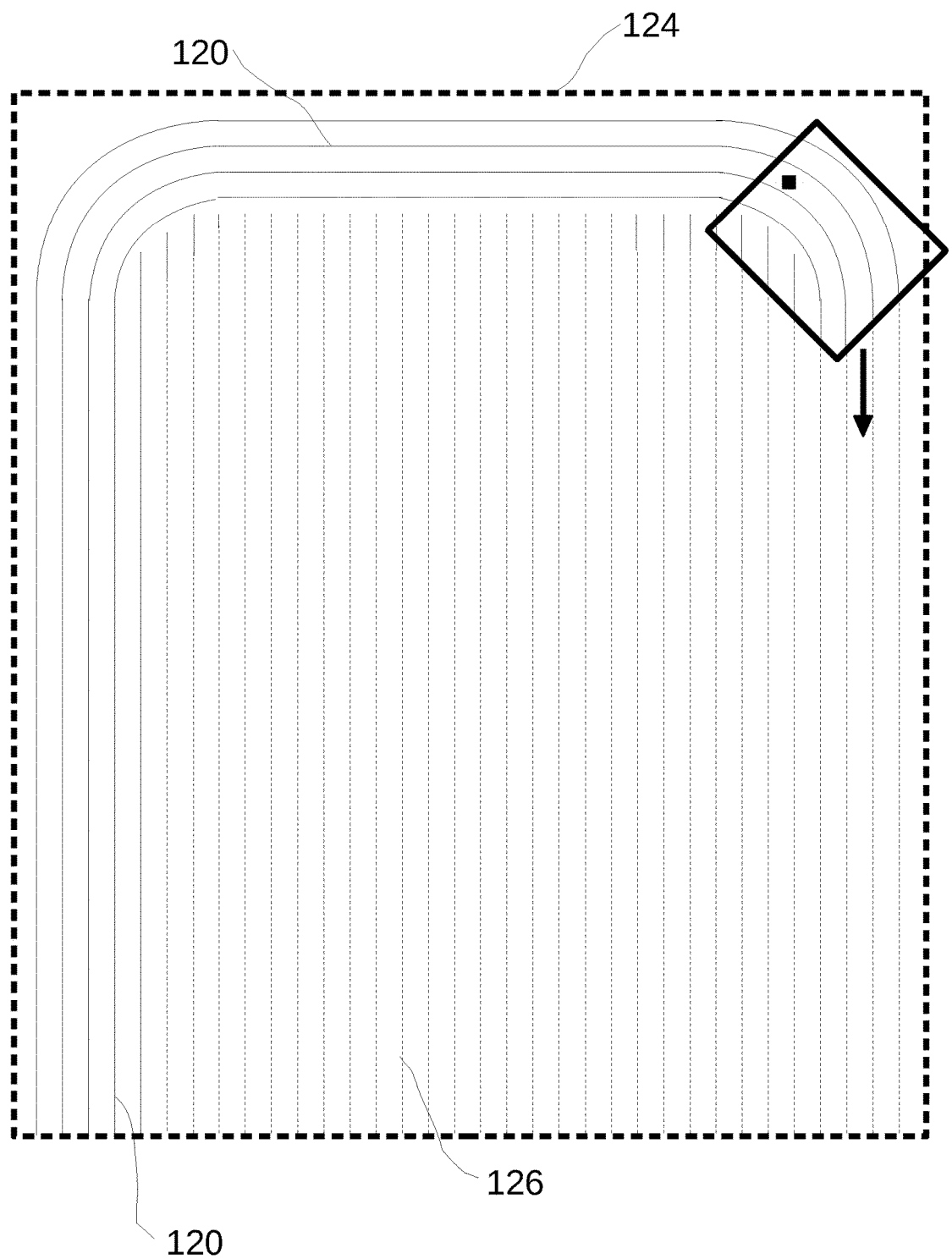
FIG. 10 depicts the geospatial data map of FIG. 9, wherein the observation window has moved further through the curve at a corner of the agricultural field.
Figure 11:
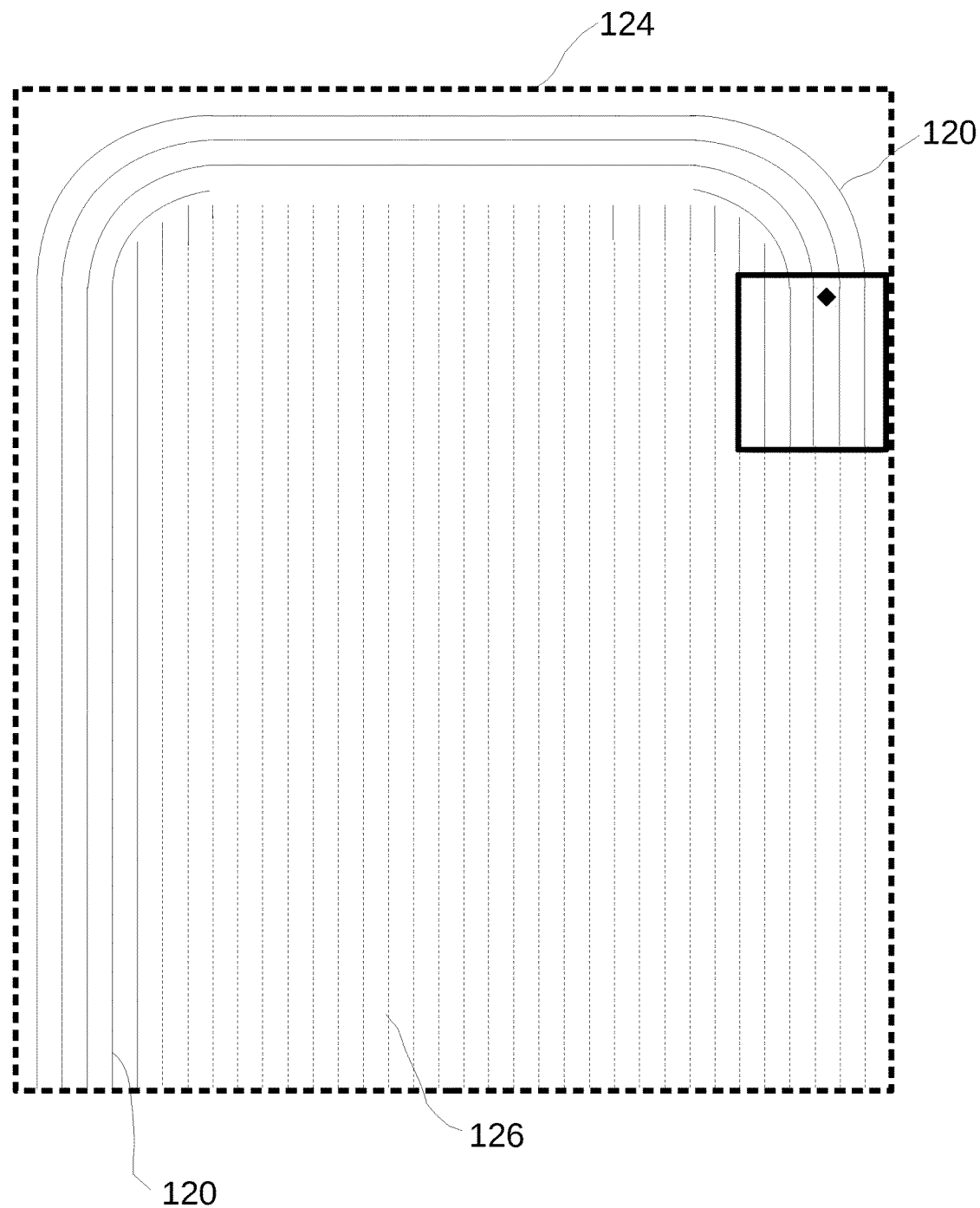
FIG. 11 depicts the geospatial data map of FIG. 10, with additional newly measured crop row positions plotted.
Figure 12:
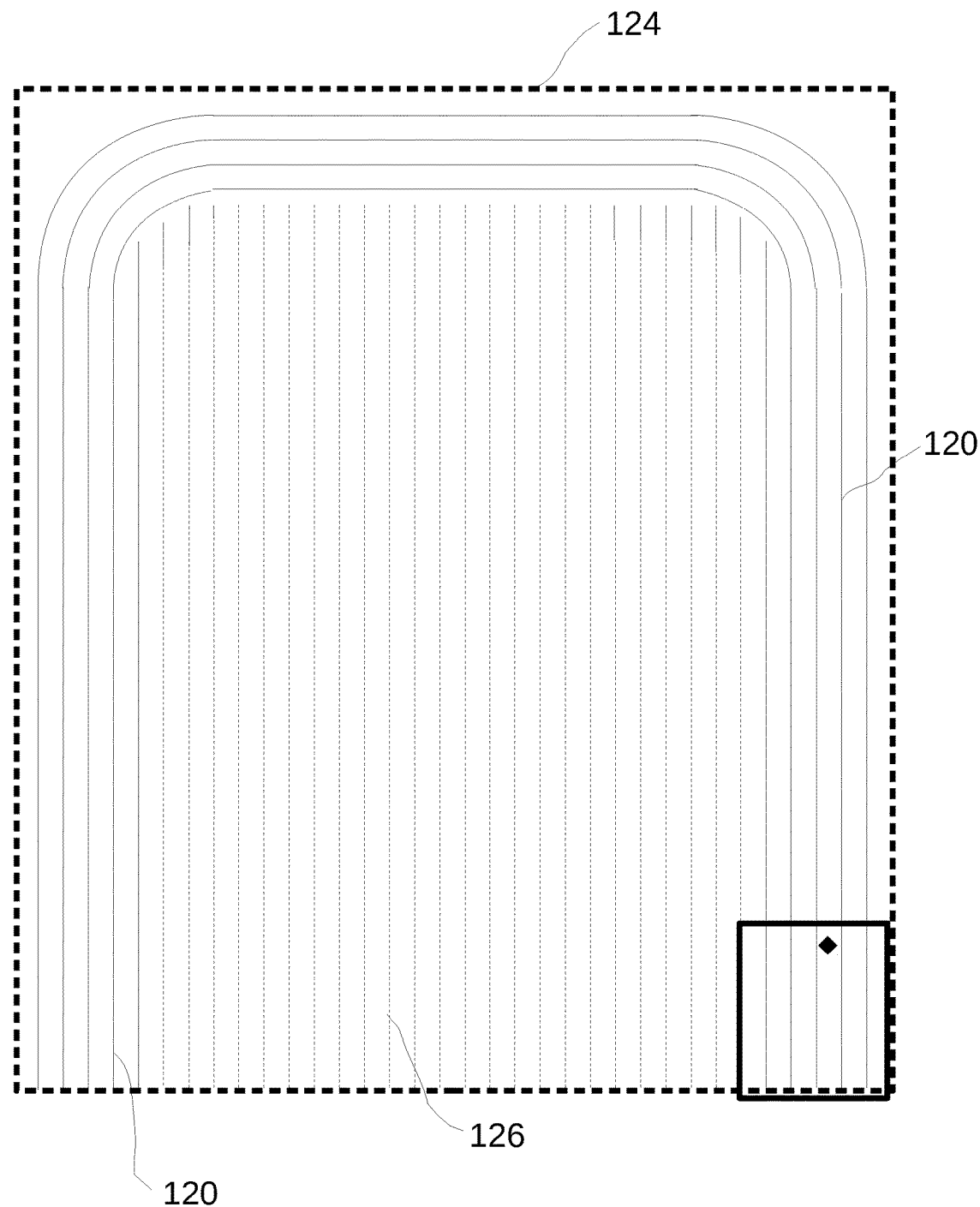
FIG. 12 depicts the geospatial data map of FIG. 11, with the actual crop row positions plotted as a path in proximity to a perimeter of the agricultural field.

Referring to FIG. 5, the self-direction program of the unmanned agricultural robot 100 can be activated to autonomously navigate the unmanned agricultural robot 100 within the perimeter 124 of the agricultural field 101, while selectively performing one or more in season management tasks. As the unmanned agricultural robot 100 moves through the agricultural field 101, onboard navigational sensors guide the machine between both actual crop row positions 120 (depicted as solid lines) and anticipated crop row positions 126 (depicted as dashed lines) until such a point that the layout of actual crop rows 120 or other vegetation create significant uncertainty about the correct path for the agricultural robot 100 to follow. At this point, the aerial mapping sensor 116 can be deployed and a local field map (L-FMAP) determined within the observation window 118, creating additional actual crop row positions 120 for reference.

In one embodiment, as the unmanned agricultural robot 100 advances between anticipated crop row positions 126 without encountering unexpected vegetation, some portion of the anticipated crop row positions 126 are re-labeled as actual crop rows 120.

Referring to FIGS. 6-12, a nonstandard annual crop row layout may exist at curved rows at the corners of the agricultural field 101. In these situations, the one or more aerial mapping sensors 116 can be used to capture the actual crop row positions 120, and can be used to refine geospatial data map 122. When progressing through curved rows, the measured, actual crop row positions 120 can be used to predict anticipated annual crop row positions 126, particularly when approaching the perimeter 124 of the agricultural field 101. For example, given a known location of the perimeter 124 of the agricultural field, the actual crop row positions 120 can be used to extend a pattern of anticipated annual crop row positions 126 to update and further refine the geospatial data map 122.

Figure 13:
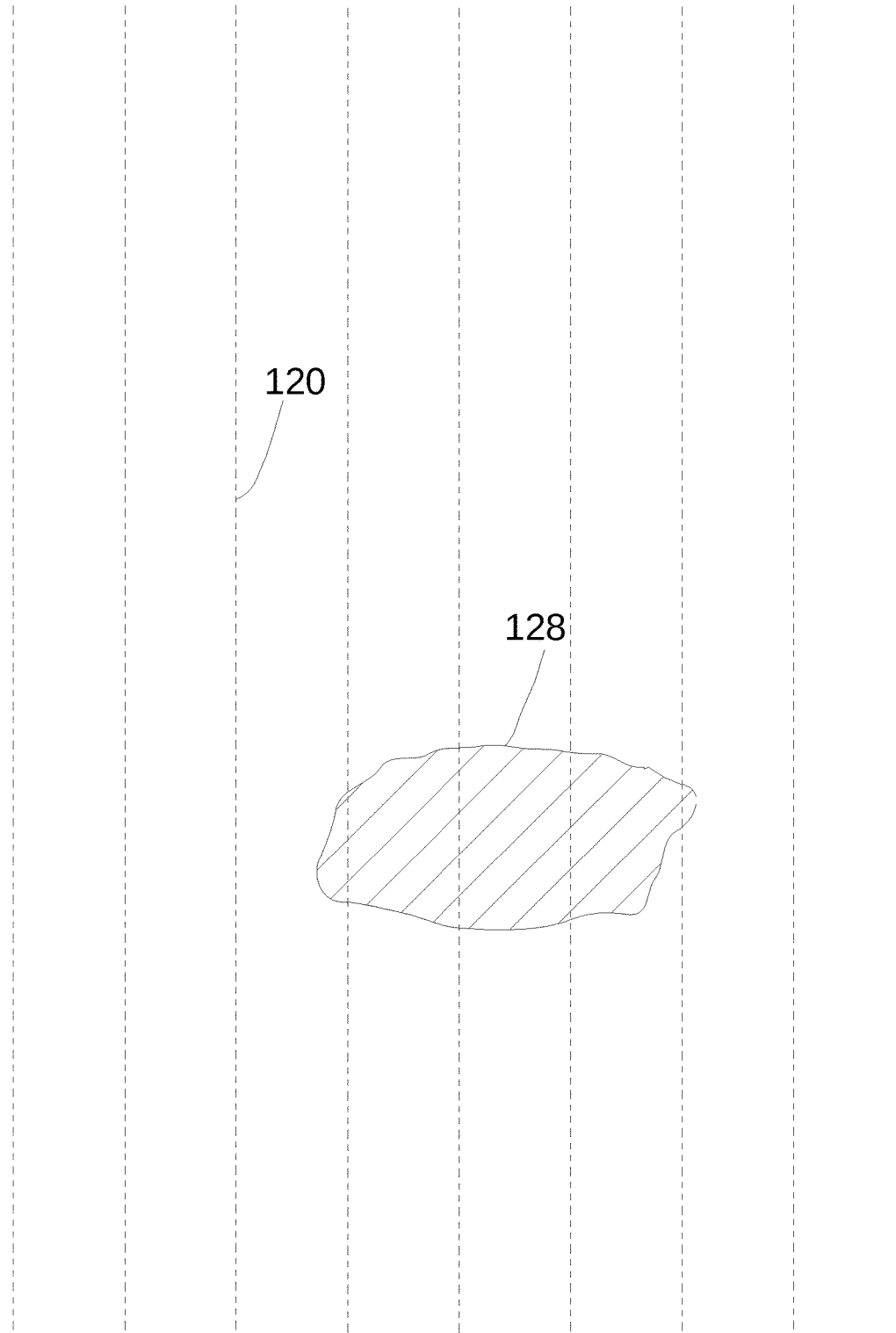
FIG. 13 depicts a partial geospatial data map depicting anticipated crop row positions (indicated by dashed lines), as well as an area of heavy weed growth (hashed area), in accordance with an embodiment of the disclosure.
Figure 14:
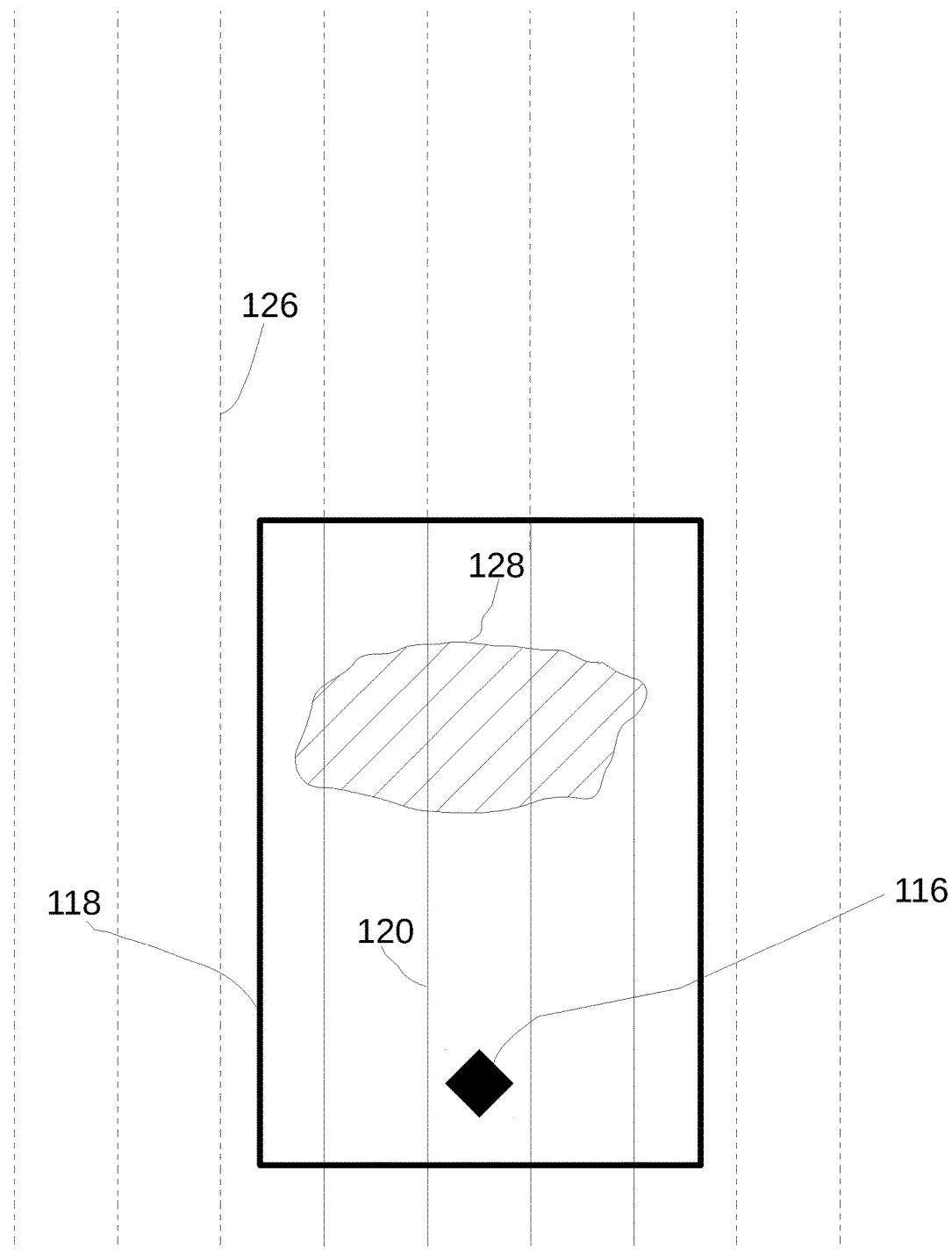
FIG. 14 depicts the partial geospatial data map of FIG. 13, wherein the actual crop row positions (indicated by solid lines) surrounding the heavy weed growth (hashed area) within an observation window have been measured, while the remaining rows in the partial geospatial data map outside of the observation window remain as anticipated crop row positions (indicated by dashed lines).

Referring to FIGS. 13-14, a partial depiction of a geospatial data map 122 in which anticipated annual crop row positions 126 are plotted (depicted by dashed lines) may include one or more areas of heavy weed growth 128. The area of heavy weed growth 128 may not be initially plotted on the geospatial data map 122. In other embodiments, known areas of heavy weed growth 128 can be initially plotted on geospatial data map 122, and refined by measurement from aerial mapping sensors 116 at a later time. For example, observation window 118 can be moved along with unmanned agricultural robot 100 to the area of agricultural field 101 containing the area of heavy weed growth 128. The actual position of area of heavy weed growth 128, along with its dimensions, density, and the surrounding actual crop row positions 120 can be measured by the one or more aerial mapping sensors 116. The area of heavy weed growth 128 and the surrounding actual crop row positions 120 can then be plotted on geospatial data map 122, as depicted in FIG. 14. In such a scenario, the unmanned agricultural robot 100 can then continue moving forward through the area of heavy weed growth 128 with a high degree of certainty that it is running over weeds and not through annual crop rows 102. In another scenario, the unmanned agricultural robot 100 could simultaneously take action to remediate the identified weed growth as it continues to carry out the main in season management task.

Figure 15:
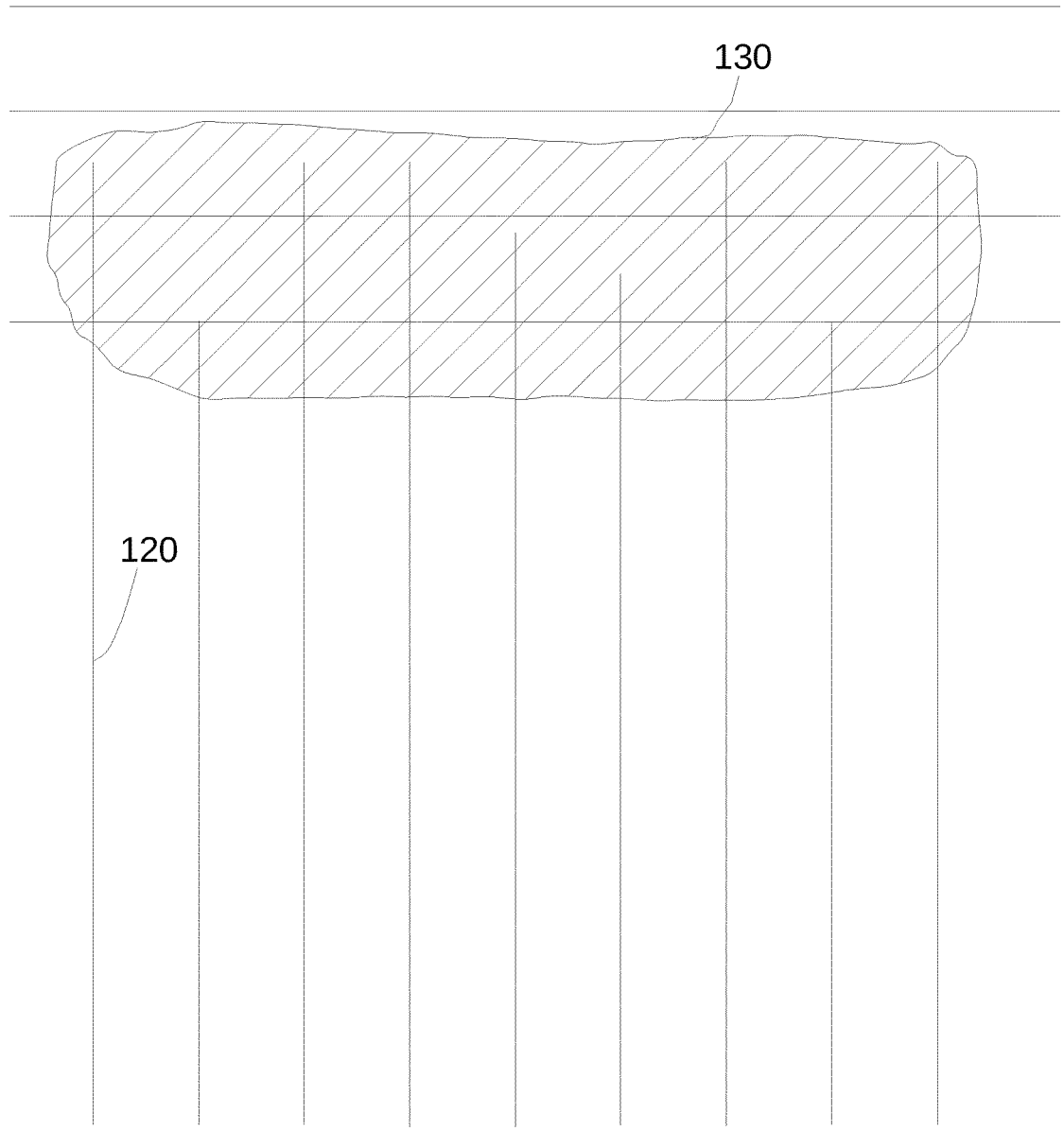
FIG. 15 depicts a partial geospatial data map depicting an area with partially overlapping crop rows (hashed area), in accordance with an embodiment of the disclosure.
Figure 16:
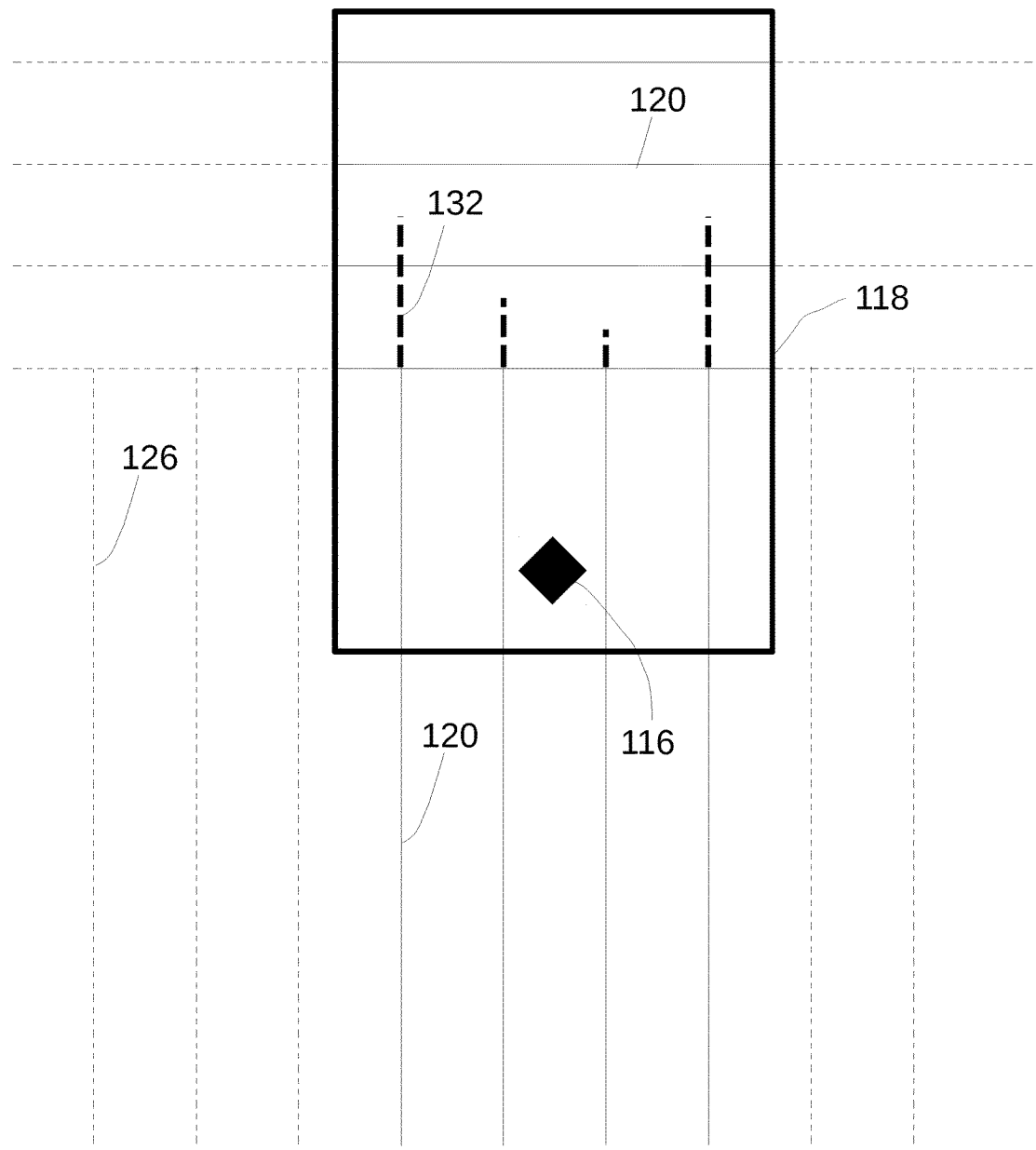
FIG. 16 depicts a partial geospatial data map, wherein plotted actual crop row positions (indicated by solid lines) include end segments (indicated by heavy dashed lines) that are known to be planted in error in that they overlap actual crop rows oriented in a substantially perpendicular direction.

Referring to FIGS. 15-16, a partial depiction of a geospatial data map 122 in which an area with partially overlapping annual crop rows 130 is depicted. Areas of overlapping annual crop rows 130 most commonly occur near the perimeter 124 of the agricultural field 101. The area with partially overlapping annual crop rows 130 may not be initially plotted on the geospatial data map 122. In other embodiments, known areas of partially overlapping annual crop rows 130 can be initially plotted on the geospatial data map 122, and refined by measurement from aerial mapping sensors 116 at a later time. For example, observation window 118 can be moved along with unmanned agricultural robot 100 to the area of the agricultural field 101 containing the area with partially overlapping annual crop rows 130. The actual position of the area with partially overlapping crop rows 130 can be measured by the one or more aerial mapping sensors 116, wherein the area with partially overlapping annual crop rows 130 can be comprised of actual crop row positions 120 that can be plotted on the geospatial data map 122.

As depicted in FIG. 16, in one embodiment, the unmanned agricultural robot 100 can identify some of the actual crop row positions 120 as having been mis-planted row segments 132. The mis-planted row segments 132 can then be plotted on geospatial data map 122. The unmanned agricultural robot can then continue to operate within the area with partially overlapping annual crop rows 130, being careful to avoid the correctly planted actual crop row positions 120, but treating the mis-planted row segments 132 as crop plants that can be driven over as needed.

Figure 17:
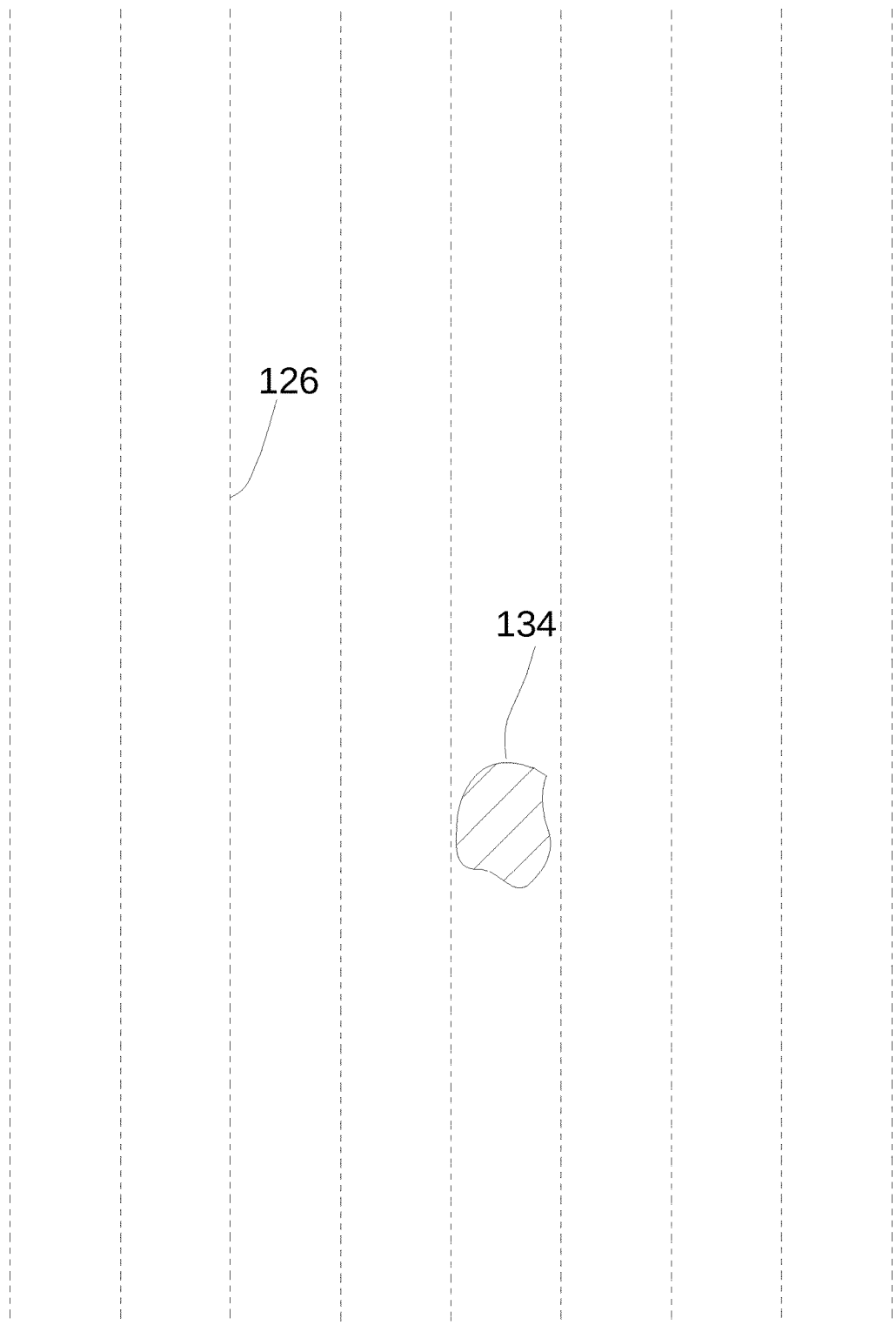
FIG. 17 depicts a partial geospatial data map depicting an obstacle (hashed area), such as a rock, located between anticipated crop row positions (indicated by dashed lines), in accordance with an embodiment of the disclosure.
Figure 18:
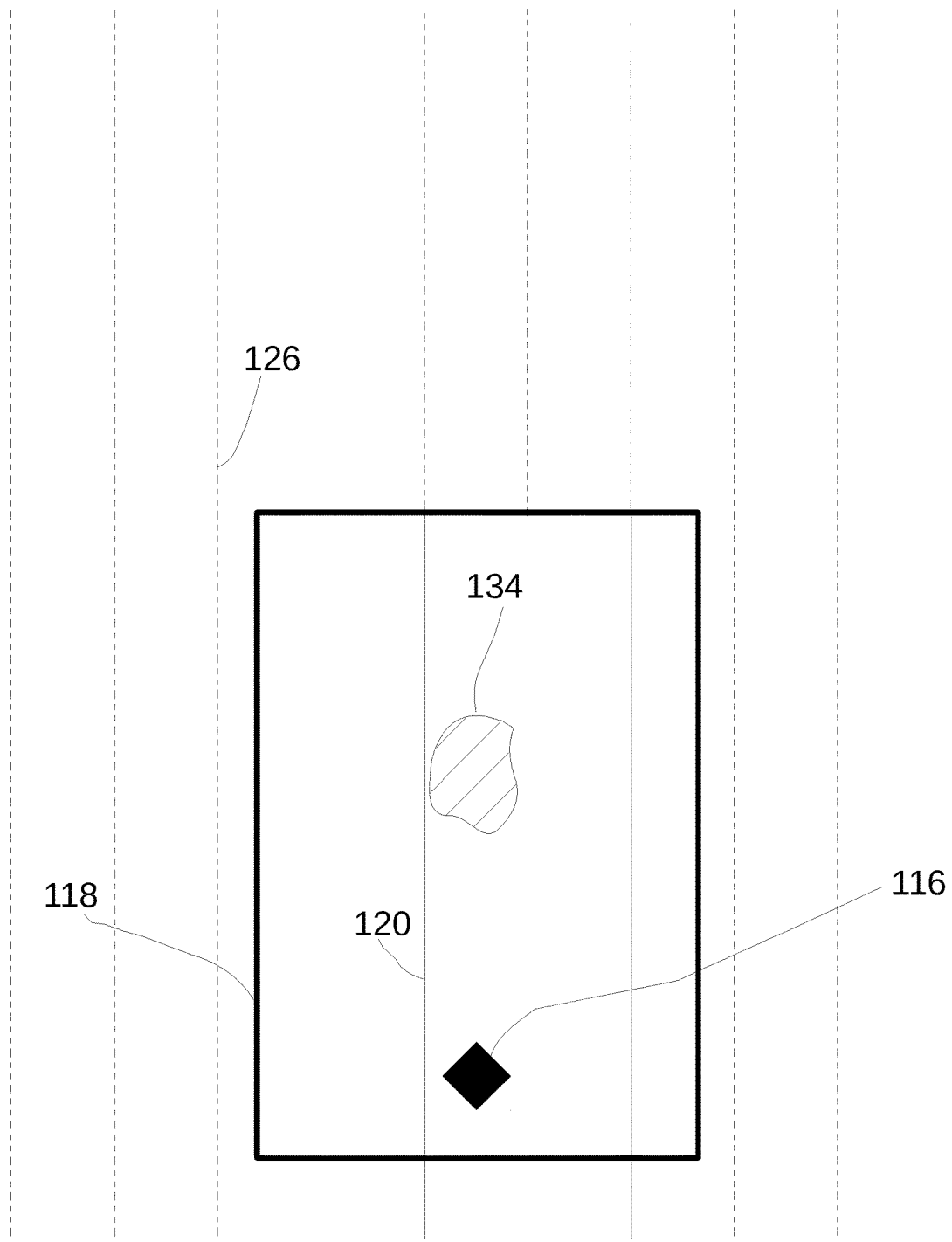
FIG. 18 depicts the partial geospatial data map of FIG. 17, wherein the actual crop row positions (indicated by solid lines) surrounding the obstacle (hashed area) within an observation window have been measured, while the remaining rows in the partial geospatial data map outside of the observation window remain as anticipated crop row positions (indicated by dashed lines).

Referring to FIGS. 17-18, a partial depiction of the geospatial data map 122 in which anticipated annual crop row positions 126 are plotted (depicted by dashed lines) may include one or more obstacles 134. An obstacle 134 may be initially plotted on the geospatial data map 122, particularly where an obstacle 134 is known. In other embodiments, obstacles 134 may not be recognized until one or more onboard cameras on the unmanned agricultural robot 100 have detected an obstacle 134 in the intended path of the unmanned agricultural robot 100 during operation. In this situation, the mast 114 could be deployed to raise the aerial mapping sensor 116 above obstacle 134 to obtain a bird's eye view of the obstacle 134. The actual position of the obstacle 134, along with the surrounding actual crop row positions 120 can then be plotted on geospatial data map 122, as depicted in FIG. 18.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A method of using an unmanned agricultural robot to generate an anticipatory geospatial data map of positions of annual crop rows planted within a perimeter of an agricultural field, the method comprising:

delivering the unmanned agricultural robot to the agricultural field, wherein the unmanned agricultural robot is programmed with a self-direction program;

positioning the unmanned agricultural robot at a starting point on the agricultural field;

deploying one or more aerial mapping sensors at a height above the agricultural field, so as to enable the one or more aerial mapping sensors to capture geospatial data within an observation window of the agricultural field, the observation window dimensioned such that a width and length of the observation window are at least three times a nominal width of the annual crop rows;

using the one or more aerial mapping sensors to measure the actual annual crop row positions within the starting point observation window relative to at least one of the unmanned agricultural robot and the perimeter of the agricultural field;

creating the geospatial data map of the entire agricultural field by plotting the actual annual crop row positions in a portion of the geospatial data map that corresponds to the starting point observation window, and filling in a remainder of the geospatial data map with anticipated annual crop row positions corresponding to the annual crop rows outside of the starting point observation window, wherein the measured actual annual crop row positions are used to predict the anticipated annual crop row positions within the perimeter of the agricultural field;

activating the self-direction program to autonomously navigate the unmanned agricultural robot within the perimeter of the agricultural field; and using the one or more aerial mapping sensors to periodically refine the geospatial data map by replacing the anticipated annual crop row positions with measured actual annual crop row positions within the observation window when an unexpected obstacle is encountered during autonomous navigation.

* * * * *